United States Patent [19]
Martin et al.

[11] Patent Number: 5,504,873
[45] Date of Patent: *Apr. 2, 1996

[54] MASS DATA STORAGE AND RETRIEVAL SYSTEM

[75] Inventors: Charles W. Martin, Richardson; Fredrick S. Reid, Plano; Gary L. Forbus, Dallas; Steve M. Adams, Plano; C. Patrick Shannon; Eric A. Pirpich, both of Garland, all of Tex.

[73] Assignee: E-Systems, Inc., Dallas, Tex.

[*] Notice: The term of this patent shall not extend beyond the expiration date of Pat. No. 5,214,768.

[21] Appl. No.: 150,810

[22] Filed: Nov. 12, 1993

Related U.S. Application Data

[63] Continuation-in-part of Ser. No. 45,025, Apr. 12, 1993, Pat. No. 5,412,791 which is a continuation of Ser. No. 430,134, Nov. 1, 1989, Pat. No. 5,214,768.

[51] Int. Cl.$^6$ .................................................... G06F 12/00
[52] U.S. Cl. ...................... 395/438; 395/488; 364/238.4; 364/236.6; 364/241.9; 364/DIG. 1; 369/34
[58] Field of Search ..................... 395/425; 364/200 MS, 364/900 MS; 369/34, 178, 37, 38, 179; 360/31, 98.04

[56] References Cited

U.S. PATENT DOCUMENTS

| | | | |
|---|---|---|---|
| 3,732,546 | 5/1973 | Ronkin et al. | 340/172.5 |
| 3,774,172 | 11/1973 | Silverman | 340/173 |
| 4,504,936 | 3/1985 | Farber et al. | 369/34 |
| 4,675,856 | 6/1987 | Rudy et al. | 369/36 |
| 4,827,462 | 5/1989 | Flannagan et al. | 369/32 |
| 4,849,838 | 7/1989 | Kogo et al. | 360/69 |
| 4,945,428 | 7/1990 | Waldo | 360/92 |
| 5,025,431 | 6/1991 | Naito | 369/36 |
| 5,025,432 | 6/1991 | Naito | 369/32 |
| 5,053,948 | 10/1991 | DeClute et al. | 395/600 |
| 5,065,379 | 11/1991 | Smith et al. | 369/36 |
| 5,121,483 | 6/1992 | Monahan et al. | 395/275 |
| 5,142,514 | 8/1992 | Verboom et al. | 369/30 |
| 5,337,414 | 8/1994 | Hashemi et al. | 395/275 |

*Primary Examiner*—Tod R. Swann
*Assistant Examiner*—Frank J. Asta
*Attorney, Agent, or Firm*—Harold E. Meier

[57] ABSTRACT

A plurality of data storage modules form a library, with a directory archive maintaining a directory of the information contained on each data storage module (file server application) or on the storage modules retained in the library (volume server application). A plurality of interface computers are coupled to a plurality of host computers for receiving data and for generating request signals to access the library. In response to a received request signal, the directory archive locates a data storage module and generates a location output signal. A control computer receives the location output signal and generates a media access signal for causing the data storage module to be loaded into a selected data recorder. An input/output data channel couples the interface computer generating the access request signal to the selected data recorder for reading or writing an entire volume of information or selected file information to/from the data storage module. In this configuration, any interface computer has access to any drive and any drive has access to any stored media, thus providing both global media and global drive access.

18 Claims, 8 Drawing Sheets

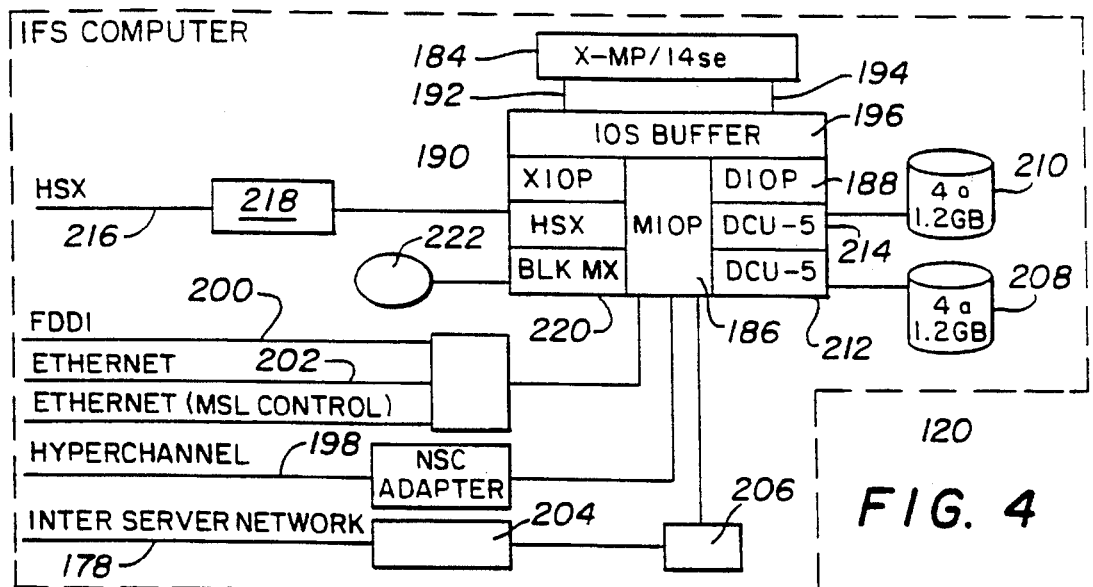
FIG. 4
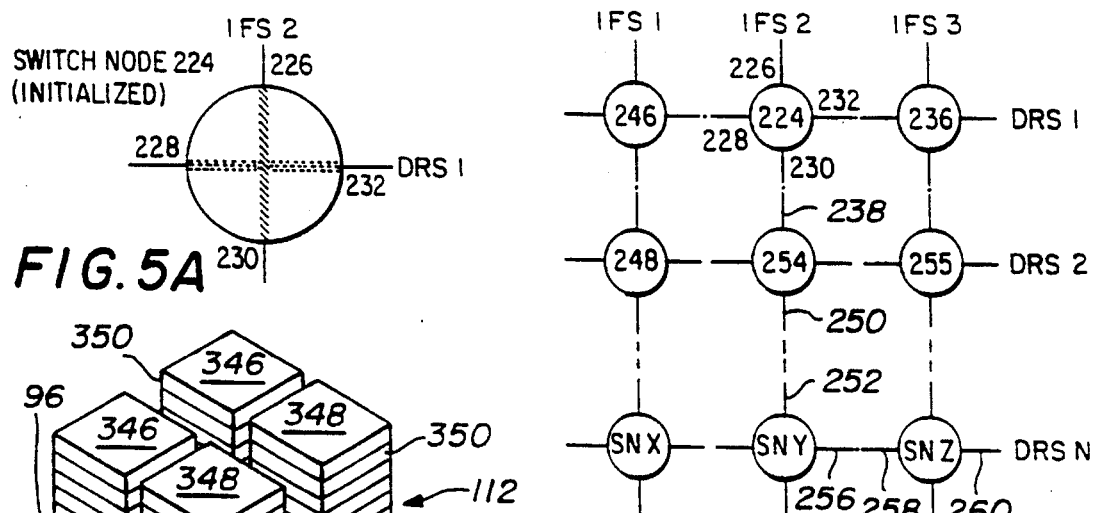
FIG. 5A
FIG. 6
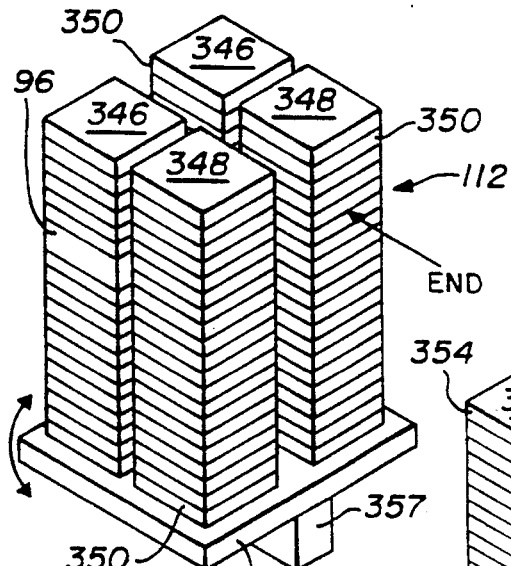
FIG. 9
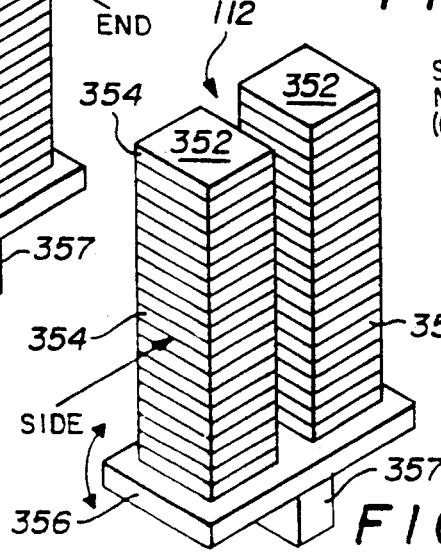
FIG. 10
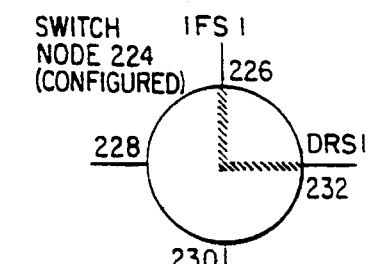
FIG. 5B

MASS DATA STORAGE AND RETRIEVAL SYSTEM

This application is a continuation-in-part of U.S. application Ser. No. 08/045,025, filed Apr. 12, 1993, now U.S. Pat. No. 5,412,791, which is a continuation of U.S. application Ser. No. 07/430,134, filed Nov. 1, 1989, now U.S. Pat. No. 5,214,768.

TECHNICAL FIELD

The present invention relates to a mass storage library (MSL) and specifically relates to a mass data storage library having a modular construction.

BACKGROUND OF THE INVENTION

The need to retain and retrieve large volumes of digital data has resulted in the need for data storage devices having ever increasing amounts of storage capacity. Data can be stored, of course, on cassettes, floppy disks, diskettes, hard disks, optical disks, capacitive disks and the like. However, the greater the amount of memory available, the more difficult it becomes to accurately access the information from multiple input computers with rapid access times and with maximum system fault tolerance.

Other prior art systems utilize a plurality of data storage mediums having a robotic arm control which retrieves stored disks or cassettes from a library and places them in the recorder. For example, data storage media are transported from a storage area to a transducer mechanism such as is utilized for magnetic tape, floppy disk, hard disk and other mass storage devices. After the transducer has completed its use of a particular storage medium, the medium is returned to the storage area to make room for another unit which is retrieved, transported to and placed in the transducer.

Some prior art data storage systems include optical storage wherein a plurality of cartridge storage slots are positioned in diverse locations and orientations and use both vertical and horizontal retrieval systems. Still other systems utilize disk storage and have a disk transport assembly which moves in parallel with the array of the disks independently of the disk retainer. The transport assembly is moveable between a first position operative to have a disk transferred between the array of disks and a disk carrier and a second position operative to have a disk transferred between the disk carrier and the disk retainer.

In order to improve fault tolerance, the prior art has provided disk files comprising a number of stacks having alternate data paths provided using crossbars. This provides some fault tolerance since if one data path fails another can be used. Some prior art systems disclose fault tolerant computer systems including a robot maintenance means which is used to replace faulty modules and still others disclose an optical storage/retrieval including a random access arm supplying several users.

Still, these systems are inadequate. No matter what drive and storage medium is used in any given installation, use of the system invariably places demands on mass storage that soon exceed the available capacity of the system. Often these demands are not foreseen when the system in initially planned and the need then arises to expand the system. However, it is difficult to expand such a system in an economical manner. Further, it is difficult in such systems to have parallel operations whereby several computers may be simultaneously accessing the mass storage library.

SUMMARY OF THE INVENTION

The present invention relates to a mass data storage and retrieval system comprising a plurality of data storage modules containing data storage elements to form a mass information storage library, a data directory archive for maintaining a directory of the library information (data) contained in each data storage element or a media archive for maintaining a directory of each storage element, and a plurality of data recorder modules, each of which is capable of receiving a selected storage element from a data storage module in the mass storage library.

A plurality of parallel operating interface computers are coupled to a plurality of host computers for receiving data and for generating request signals to access desired information (i.e., data (files) or media (volumes)) from the data storage module. A directory function is included in the interface computers and the media archive for receiving the request signal, locating the data storage element in the library and generating a location output signal (a volume server application). Alternatively, the directory function utilizes the data directory archive to locate the address on a data storage element to generate the location output signal in response to the request signal (a file server application).

A control computer is coupled to the directory computer and the mass storage library for receiving the location output signal from the directory computer and in response thereto generating a first signal for causing the identified data storage element to be loaded into a selected data recorder. A selectively configured data channel couples the interface computer generating the access request signal to the selected data recorder module for selectively reading data from and writing data to the selected storage element.

The mass storage library comprises a plurality of rows of aligned racks each of which holding a plurality of data storage elements in parallel slots on at least two sides of the racks. An automatic storage element accessor is located between and associated with the rows of storage racks on each side and with one of a plurality of data recorder modules such that the storage media on opposing sides of the racks in either row may be retrieved by a common accessor. The accessor retrieves a designated one of the storage elements from a slot in one side of the associated racks for insertion in the associated recorder module for read and write operations. The library further includes means for allowing a storage element on any side of the rack to be retrieved by the accessor (i.e., by selectively rotating each rack to face the accessor or by providing a storage element feed-through capability). Thus, if an accessor on either row fails, the tape cassettes normally facing that accessor can be made available to another functioning accessor. A lateral transfer trolley is associated with an end of each row of storage racks for moving data storage elements between rows. This ability to rotate the racks, access the media by feed-through or laterally transfer media is useful for migrating the tape cassettes to idle recorder modules which results in a load leveling of tasks and a more efficient use of recorder resources.

The system further contains special read-after-write processing hardware to provide a system error substantially better than the recorder alone can provide thus making screening of tapes unnecessary. This processing hardware performs a bit-for-bit compare of certain data. If the compare fails or if the internal error correction passes a preset error threshold, then the data block which is either in error or suspect is rewritten on the tape without stopping or repositioning. Thus, areas of tapes which contain flaws beyond acceptable error correction capabilities are effectively edited from the tape while the data is being recorded.

To maintain a directory of the data that is contained on the library tapes, the mass storage library concept separates the directory data from the library data by preferably placing the directory data on a high density, random access removable, erasable media (e.g., optical disk or magnetic disk). This allows the directory information to be quickly accessed without having to access the actual library data. For large systems, the directory media are configured using a "jukebox" system to allow an expandable, on-line archive of the directory data. Alternatively, the directory information is stored with the data on the tape in a special reserved directory partition.

Thus, the present invention allows for the formation of a mass storage library using a modular system that provides versatility along with implementing the concept of global access to the data. Such global access in the present invention is provided by a network that connects each tape server interface computer with one or more host computers and with the data recorder modules to provide for system fault tolerance and increase system availability. In a smaller configuration of the system, the network connects a tape server interface computer to a corresponding data recorder module(s) in a global access library configuration.

BRIEF DESCRIPTION OF THE DRAWINGS

A more complete understanding of the invention may be had by reference to the following detailed description when taken in conjunction with the accompanying drawings, wherein:

FIG. 4 is a diagrammatic representation of the disk server computer;

FIG. 5A is a schematic representation of a single crossbar switch node in a first configuration;

FIG. 5B is a schematic representation of a single crossbar switch node in a second configuration;

FIG. 6 is a schematic representation of a plurality of serially coupled crossbar switch nodes;

FIG. 9 is a diagrammatic representation of one rotational configuration for the storage module;

FIG. 10 is a schematic representation of a second rotational configuration for the storage module;

DETAILED DESCRIPTION OF THE DRAWINGS

Figure 1:
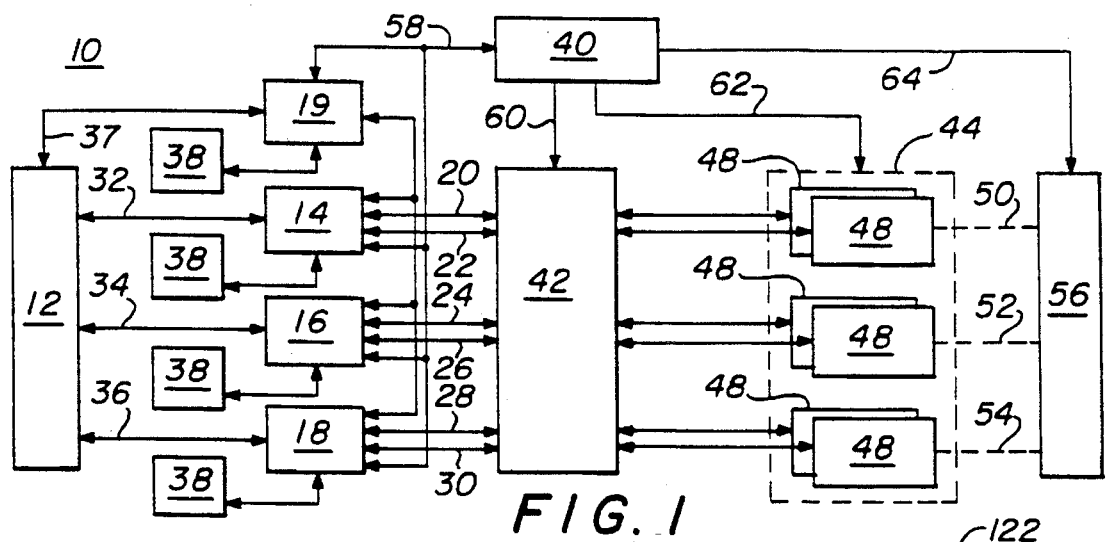
FIG. 1 is a diagrammatic representation of the mass storage library of the present invention.

In the mass storage system 10 shown in FIG. 1, interface computers 14, 16, 18 and 19 provide the control for communicating with the client users or host computers 12, for accepting data from one or more of a plurality of host computers 12 on lines 32, 34, 36 and 37, for storing the data and for maintaining a media directory or archive 38. Computer 19 utilizes an on-line archive capability while computers 14, 16 and 18 provide direct access to the mass library data storage units.

Two types of interface computers are used to facilitate system functioning. The first, an interface subsystem (IFS) disk server 19, is of comparable power as a CRAY computer that provides a high performance on-line archive capability. The IFS disk server 19 may further have access to the tape storage if desired. The second, a plurality of IFS tape servers 14, 16 and 18, are of comparable power as CONVEX computers that provide a direct tape storage capability. In a smaller configuration for the system 10, an IFS tape server may also function as a disk server.

The computers 14, 16, 18 and 19 may be accessed simultaneously and in parallel by one or more of the host computers 12. In like manner, multiple outputs are provided by the IFS tape server computers 14, 16 and 18 as illustrated by lines 20 and 22, 24 and 26 and 28 and 30. It is to be understood that two output lines are shown for purposes of illustration only and, as will be seen hereafter, more than two outputs from each of the computers 14, 16 and 18 may be operating in parallel and simultaneously.

The outputs of the IFS tape server computers 14, 16 and 18 on lines 20, 22, 24, 26, 28 and 30 are coupled to a switch module 42 which provides global connectivity between any IFS tape server computer 14, 16 or 18 and any drive subsystem 48 in the drive unit 44. Alternatively, in a smaller configuration of the system 10, each IFS tape server 14, 16 and 18 is directly (non-globally) connected via lines 20, 22, 24, 26, 28 and 30 to a corresponding drive subsystem(s) 48 in the drive unit 44 (see FIG. 14). The data storage modules, for example cassette tapes, accessed by the drive subsystem 48 are stored in a transport subsystem 56 and are automatically accessed and loaded into the appropriate drive subsystem 48 by robotic means as illustrated by dashed lines 50, 52 and 54 to provide global access to the data. Although the description of the invention will be made referring to tape cassettes as the storage elements, it should be understood that the invention contemplates utilization of other and additional storage media.

The control subsystem 40 allocates and de-allocates the common resources present in the mass storage library system 10. When an interface tape server computer 14, 16 or 18 or the interface disk server computer 19 receives a command to read or write data, it first requests resources (i.e., files or volumes) from the control subsystem computer 40 which will then initialize and position the appropriate resources and inform the requesting IFS of resource availability. Control of the recorder resources is then passed to the requesting IFS. Once the operation is complete, the controlling IFS notifies the control computer 40 and the resources are de-allocated.

Communications between the IFS tape servers 14, 16 and 18 and the IFS disk server 19 and the control computer occur via line 58 which comprises any one of a number of commercially available networks. The control computer further communicates with the switch subsystem 42 through line 60, the drive subsystem 44 through line 62 and the storage/transport subsystem 56 through line 64. These lines 58, 60, 62 and 64 are not necessarily independent.

The normal mode of operation for the mass data storage and retrieval system 10 "hides" not only the location of stored data from users, but also hides the type of medium on which the data is stored. Thus, application programs are technology independent and are insulated from storage technology and system implementation changes. The mass data storage and retrieval system further hides the structure and meaning of the stored data, thus allowing the user to retrieve data in a stored file in a variety of ways (i.e., volumes, whole files, parts of the files, etc.). Such data hiding allows the mass data storage and retrieval system to function efficiently and effectively in a variety of applications and environments.

Figure 2A:
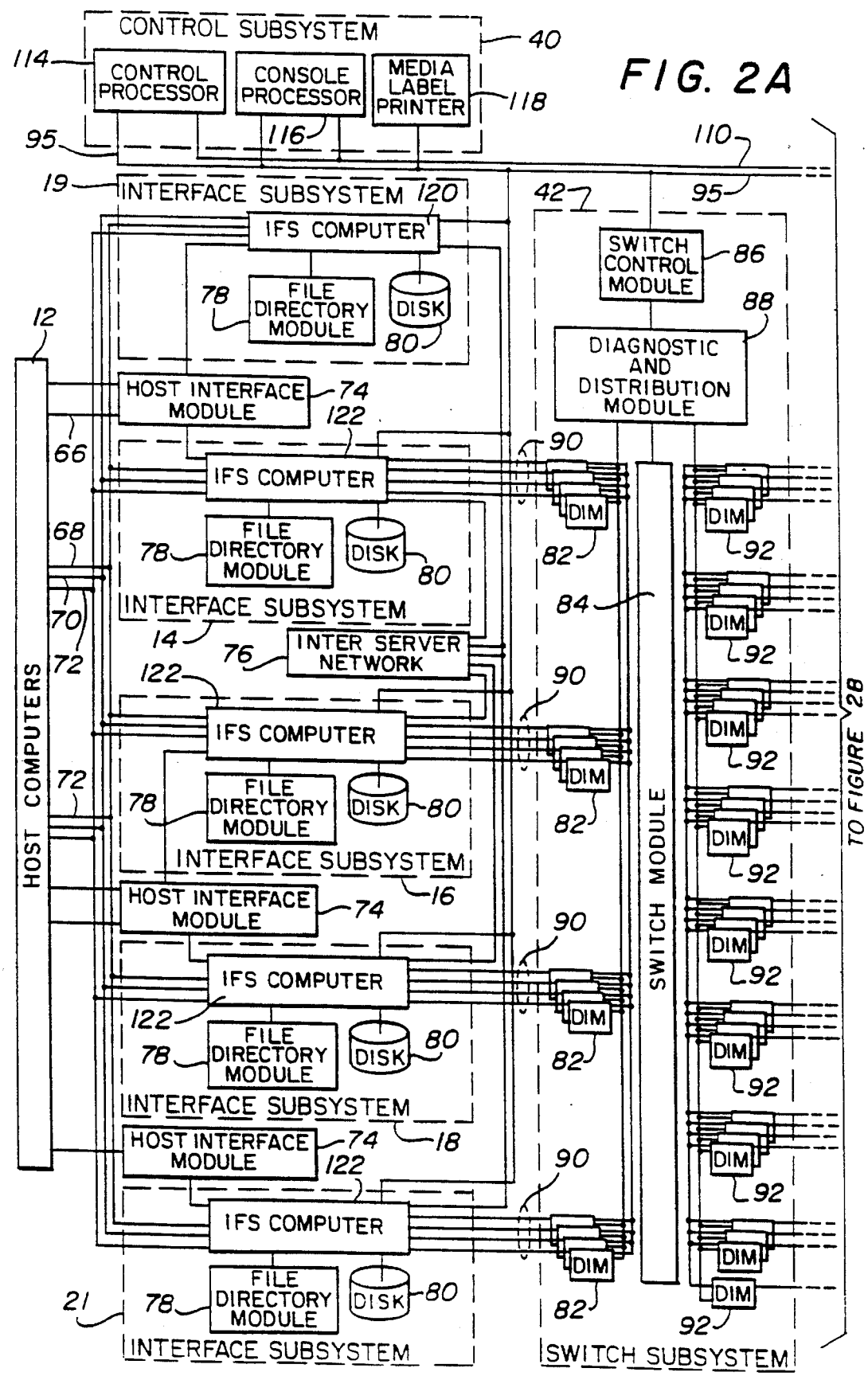
FIGS. 2A and 2B are a block diagram of the mass storage library; 10
Figure 2B:
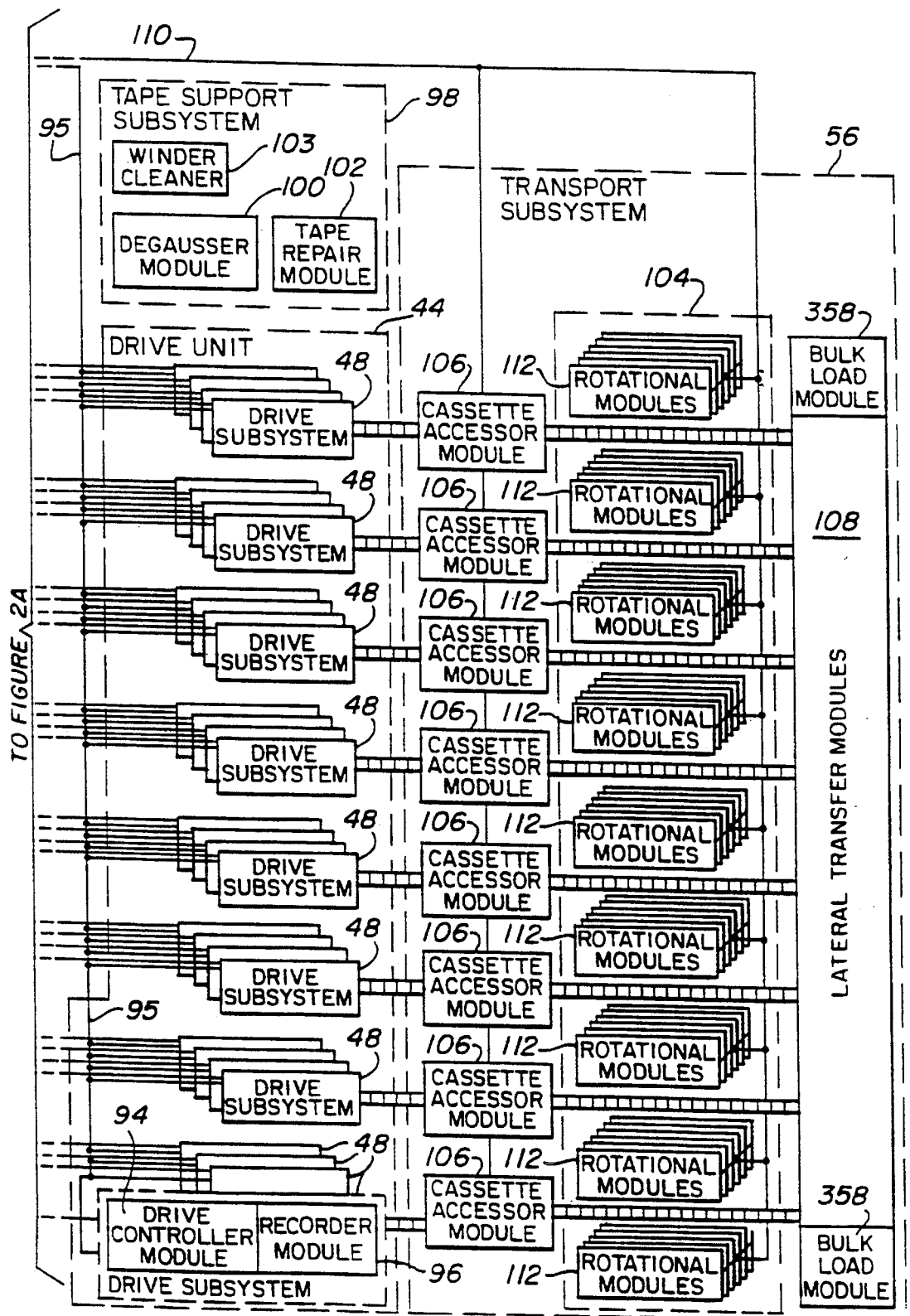

A more detailed diagram of the mass storage library is illustrated in FIGS. 2A and 2B. The same numerals are used in FIGS. 2A and 2B for the major system components as were used to represent such components in FIG. 1 except that FIG. 2A illustrates the use of five interface subsystems 14, 16, 18, 19 and 21, instead of the four shown in FIG. 1. The computers 14, 16, 18 and 21 are IFS tape servers while the computer 19 is an IFS disk server. The five interface subsystems are shown for example only, and additional or fewer subsystems may be used in the invention if desired.

The primary function of the five interface subsystems is to send and receive commands and data to and from the host computers 12. As shown, each interface subsystem (IFS) is connected to a plurality of the host computers 12 through any of four well-known types of external communication networks; a HiPPI or high speed interface line 66; an Ethernet channel on line 68; an FDDI on line 70; and a HYPERchannel® on line 72. Each of these four external networks is coupled to the IFS subsystems through a host interface module (HIM) 74.

The host interface module 74 provides the connectivity between the IFS computers 14, 16, 18, 19 and 21 and the network. In the case of the HiPPI interface on line 66, an existing Ultra Network 74 (shown in FIG. 3 and FIG. 4) is used to provide HiPPI conversion for coupling to the IFS tape serves 14, 16, 18 and 21. Unless the IFS disk server 19 is directly connected to the tape library, the IFS disk server communicates with any of the IFS tape servers 14, 16, 18 and 21 when it needs to store or retrieve data from the cassette tape library via the inter-server network 76.

Each IFS unit 14, 16, 18, 19 and 21 has a file directory module (FDM) 78 which comprises at least one storage medium for maintaining a directory in a file server application of the information contained on each data storage module. The FDM 78 contains information indicating if the requested file is on disk or has been archived to tape. If the FDM 78 is configured in an IFS tape server 14, 16, 18 or 21, then it includes a hardware configuration that comprises, for example, an optical disk jukebox which contains erasable optical disk drives and storage modules. The directory may alternatively be stored on a magnetic disk or in a special, reserved directory partition on the tape media. In the case where the FDM 78 is used in the IFS disk server 19, it is a proprietary unit that maintains file directory information for the disk server 19. Alternatively, each IFS tape server 14, 16, 18, 19 and 21 has a volume directory module (VDM) 78 comprising a storage medium for maintaining a directory in a volume server application of the data storage modules (volumes) stored in the library.

Each of the IFS tape server units 14, 16, 18 and 21 also has a disk drive module 80 for storing file or volume directory information along with file data or data volumes. Thus, certain repeatedly accessed file data or volumes of data are loaded from the tape media to the disk drive module 80 to avoid the need for frequent library access. In the case of the IFS disk server 19, the included disk drive 80 similarly contains both file or volume directory information along with file data or data volumes. The disk drives 80 also provide storage for system software such as system administration and diagnostic routines, and store date necessary to access further file directory information stored on optical disk.

When the disk drive 80 reaches a predetermined fill level, the resident software spools the data off to an IFS tape server 14, 16, 18 or 21 via the INTER SERVER NETWORK 76 according to a predetermined set of policies. One policy, the storage policy, identifies files for archive in the library according to a number of specified parameters. 10 For example, the storage policy is automatically initiated when the number of files in the class exceeds a specified limit. Another policy, the truncation policy, truncates files also according to a number of specified parameters. Yet another policy, the migration policy, selectively initiates the storage and truncation policies to efficiently manage the stored data files. These policies are further used in retrieving data from archive.

The IFS disk server similarly has the ability to spool data off to cassette tapes in the mass storage library. Resident software in the IFS 19 performs this function automatically. IFS 19 is still responsible for providing that data and file information to the user even though the data has been stored on cassette tape. IFS disk server 19 further has the capability to store data in any of the IFS tape servers 14, 16, 18 or 21.

The switch subsystem 42 comprises four modules: the data interface module 82 (DIM); the switch module 84; the switch control module 86; and the diagnostic/distribution module 88. The switch subsystem 42 provides the IFS tape servers 14, 16, 18 and 21 with the ability to be connected for global access to any drive subsystem 48 in drive unit 44. This connectively is provided by establishing a one-for-one connection between any of the four outputs or interfaces 90 from each IFS tape server 14, 16, 18 and 21 to any of the forty (nominal) drive subsystems 48 in drive unit 44. The data interface module 82 (DIM) provides the one-for-one connection to the interfacing subsystems on both sides of the switch subsystem 42. The DIM 82 in the switch subsystem 42 contains the functions necessary to provide data to switch module 84 for selectively coupling to another DIM 92 on the other side of the switch module 84. The switch module 84 is composed of modular crossbar switch functions that provide connectability between all IFS DIMs 82 to all drive subsystem DIMs 92 and vice-versa.

The switch control module 86 in switch subsystem 42 interfaces with the mass storage library (MSL) through the control Local Area Network (LAN) channel 95 (line 60 in FIG. 1). On channel 95, the module 86 receives commands and returns subsystem 42 status. Commands received from the control subsystem 40 initiate either a switch function or a diagnostic test run by the diagnostic/control module 88. Prior to any read or write operations, the control subsystem (CNS) 40 commands the switch subsystem 42 to connect any IFS DIM 82 to any drive subsystem DIM 92. All subsystem status is routed to the switch control module 86 which provides the control to format and send status to the CNS 40. The switch module 84 incorporates a crossbar switch component which will be disclosed in more detail hereafter that functions to connect any IFS interface 90 to any drive subsystem 48 in drive unit 44.

The diagnostic/distribution module 88 provides the central point for distributing control information within the switch subsystem 42. The diagnostic/distribution module (DDM) 88 has a distribution component that distributes control information from the switch control module 86 to all other modules. DDM 88 also provides a diagnostic function that generates and compares test data. The DDM 88 is commanded by the switch control module 86 to generate and send diagnostic data through the subsystem.

Figure 14:
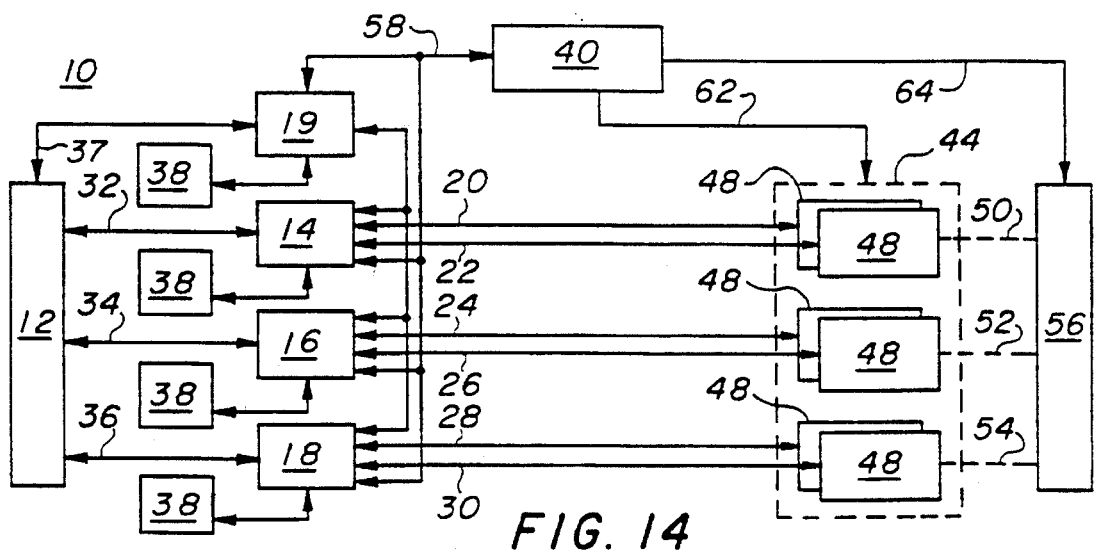
FIG. 14 is a diagrammatic representation of a smaller, more limited, configuration of the mass storage library shown in FIG. 1.

It will, of course, be understood that the system 10 may be configured without a switch subsystem 42 by directly coupling each IFS tape server 14, 16 and 18 to an individual or multiple corresponding drive subsystem(s) 48 of the drive unit 44 (see FIG. 14). This particular system configuration will not allow global access by any of the IFS tape servers 14, 16 and 18 to any drive subsystem 48 as in FIG. 1. However, with the use of the disclosed drive unit 44, storage architecture 56 and transports 50, 52 and 54, global media access is maintained.

Turning now to FIG. 2B, the drive unit 44 includes a multiplicity of drive subsystems 48, each of which comprises a drive controller module 94 (DCM) and a recorder module 96 (RM). The main function of the drive subsystem 48 (DRS) is to record data on and playback recorded digital data from storage media (cassettes) stored in the MSL. DRS 48 interfaces with the switch subsystem 42 (SWS), the transport subsystem 56 (TRS) and the control subsystem 40 through the control LAN 95. The DRS 48 interface with the SWS 42 and the control LAN 95 is an electrical interface while the interface to the TRS 56 is a mechanical interface in which storage media are retrieved or inserted by a robotic function. The DCM 94 interfaces with the MSL control LAN 95 to receive commands from and return subsystem status to the CNS 40.

When a read or write operation is to be performed, the commanded IFS 14, 16, 18 or 21 requests resources from the CNS 40. CNS 40 responds with a resource allocation list that contains the allocated drive subsystem 48. The allocated DRS 48 is commanded throughout the read/write operation by that IFS 14, 16, 18 or 21 via a data channel established through the SWS 42. Once the operation is complete, status is returned from the DRS 48 to the controlling IFS 14, 16, 18 or 21.

The DCM 94 internally interfaces with the recorder module 96. The DCM 94 commands the RM 96 to perform various recorder functions such as start/stop, thread tape, record and the like. The RM 96 returns status to the DCM 94 upon completion of a command. The RM 96 comprises a high speed data recorder capable of accepting and sending data at the rate up to, or exceeding 240 Mbps. The RM 96 interfaces with the DCM 94 for command/status and data and also interfaces to the TRS 56 via a robotic accessor. A recorder module 96 can be loaded either manually or by a robotic accessor.

The tape support subsystem 98 (TSS) provides automatic system level support and repair for the media. Degausser module 100 provides the system with the ability to bulk erase the tapes. Tape repair module 102 provides the system with the ability to repair broken tape or cassettes. Winder/cleaner module 103 provides the system with the automatic ability to clean the tape media and re-pack the media.

The tape transport subsystem 56 (TRS) moves tape cassettes between the drive subsystem 48 and the storage subsystem 104 (STS). The primary function of the TRS 56 is to retrieve cassettes from the recorder modules 96 and store them in the STS 104 and vice-versa. The transport subsystem 56 (TRS) in addition to the STS 104, also includes the cassette accessor module 106 and the lateral transfer module 108. All of the TRS 56 modules are commanded by the CNS 40 via the MSL storage LAN 110 (line 64 in FIG. 1).

The cassette accessor modules 106 (CAM) are implemented by any well known robotic function. The CAM grasps a cassette tape from a storage module 112 for insertion either into a RM 96 in a DRS 48, or in a slot in the lateral transfer module 108 (LTM), or in another storage module 112 in STS 104. The cassette accessor module 106 traverses an aisle servicing any number of drive subsystems 48 (although only four are shown in each of the eight groups in the drive unit 44 in FIG. 2 for purposes of simplicity of the drawings) and any number of storage modules 112 illustrated in the storage subsystem 104. The total number of storage modules in an aisle is dependent on the location of the aisle as will be seen hereafter. The cassette accessor module moves in both a horizontal and vertical axis and includes one or more independent arms for retrieving tapes from the storage module 112.

The LTM 108 provides the TRS 56 with the ability to move tapes between storage rows with a minimum amount of user interaction. The LTM 108 spans the width of the transport subsystem 56 and is located at the ends of the aisles as can be seen more clearly in FIG. 11. The LTM 108 comprises sectional transfer components that are connected end-to-end and are stacked two units high.

The storage subsystem 104 (STS) provides the storage modules 112 for accommodating cassette tapes. The exact number of cassettes accommodated is dependent on the STS configuration. The storage modules 112 are preferably rotational modules (RTM) or feed-through modules (FTM). The rotational modules 112 (see FIGS. 9 and 10) rotate about the vertical axis in 90° increments and are commanded by the CNS 40 via the MSL storage LAN 110. The rotational modules 112 provide each of the CAMs 106 with the ability to access cassette tapes from an adjacent aisle. This rotational ability improves system availability and reliability. This ability is especially useful where all of the recorder modules 96 available to one CAM are busy or where a cassette accessor has become disabled. Alternatively, the feed-through modules (FTM) 112 (see FIGS. 12 and 13) allow for tapes stored on any side of the modules to be accessed from either aisle. The LTM 108 supports load leveling by transferring cassettes between any two aisles.

The CNS 40 includes a control processor 114, a console processor 116, a high speed printer (not shown), and a media label printer 118. The control processor 114 and the console processor 116 are Sun 3 Series 200 workstations. They share a disk pool and provide immediate mutual redundancy. Both processors are connected to the line printer (not shown) that is capable of printing at least 300 lines per minute. Both processors are also connected to a media label printer 118 through the MSL control LAN 95. The media label printer 118 produces machine readable and human readable media labels. This configuration enables the CNS 40 to tolerate the failure of a single disk drive with no degradation in performance or throughput. In the event of a processor failure, either processor can be configured to perform the entire processing function.

As stated previously, the interface subsystem (IFS) provides the capability for the mass storage library 10 to send and receive data to and from other computers over a variety of computer networks. The IFS is composed of a set of loosely coupled modules that provide the flexibility required to meet the needs of the user complex. Interchangeable and expandable IFS components are provided so that each IFS module can be configured to support specific performance and functional needs. Each IFS uses commercially available hardware and software products. Each IFS is composed of an IFS computer module (ICM) and a file directory module 78 (FDM) or volume directory module 78 (VDM) and is coupled to a host interface module 74 (HIM). The IFS disk server 19 includes an IFS computer module 120 (ICM) which may comprise a CRAY X-MP/14se Super Computer to provide a high performance on-line archive capability. Each of the other IFS tape server units 14, 16, 18 and 21 utilize an ICM 122 which may comprise a CONVEX 232 Computer and this implementation provides the user with a direct interface to the mass storage drives. The IFS tape server computers 122 and the IFS disk server computer 120 perform the same basic function but offer different performance features. The data and communication length between the IFS tape servers and the IFS disk server is provided by the inter-server network 76.

The host interface module 74 (HIM) contains the physical interface components that provide the system with the capability to communicate with the low speed and high speed user system interfaces. It is a logical grouping of the components and adapters, well known in the art, that provide the capability to interface with the Ethernet Network on line 68, the HYPERchannel® network on line 72, the FDDI token ring network on line 70 and the high speed HiPPI channel on line 66. Thus, the HIM 74 enables the system to communicate with user systems that are connected to one or more IEEE Standard 802.3 Local Area Networks (LANs).

HYPERchannel® processor adapters provide the system with the capability to communicate with the user systems that are connected to one or more HYPERchannel® networks. Two different HYPERchannel® processor adapters are required for the system. The A130 HYPERchannel® adapter provides the capability for the CRAY Computer 120 to communicate with the user systems that are connected to a HYPERchannel® network. This adapter is specifically designated with a pair of 16-bit high speed synchronous interfaces for connectivity to the IFS Computer 120. An A400 HYPERchannel® adapter combined with the PL150 processor interface provide the capability for the CONVEX C232 Computer 122 to communicate with the user systems that are connected to a HYPERchannel® network. These items are all commercially available and are well known in the art.

The fiber-distributed data interface (FDDI) utilizes a SUPERNET chip-set that implements the FDDI standard.

A direct HiPPI channel connection is made to the CRAY IFS Computer 120. The HiPPI channel is capable of sustaining an effective transfer rate of at least 200 Mbps through the HiPPI data link.

The CONVEX C232 Computer 122 does not currently provide an I/O channel that is directly compatible with the CRAY HiPPI channel. Therefore, Ultra products are utilized to provide connectivity between the CONVEX C232 Computer and the HiPPI channel. The system is capable of achieving 200 Mbps between the CONVEX C232 Computer 122 and the Ultra Network Hub.

Figure 3:
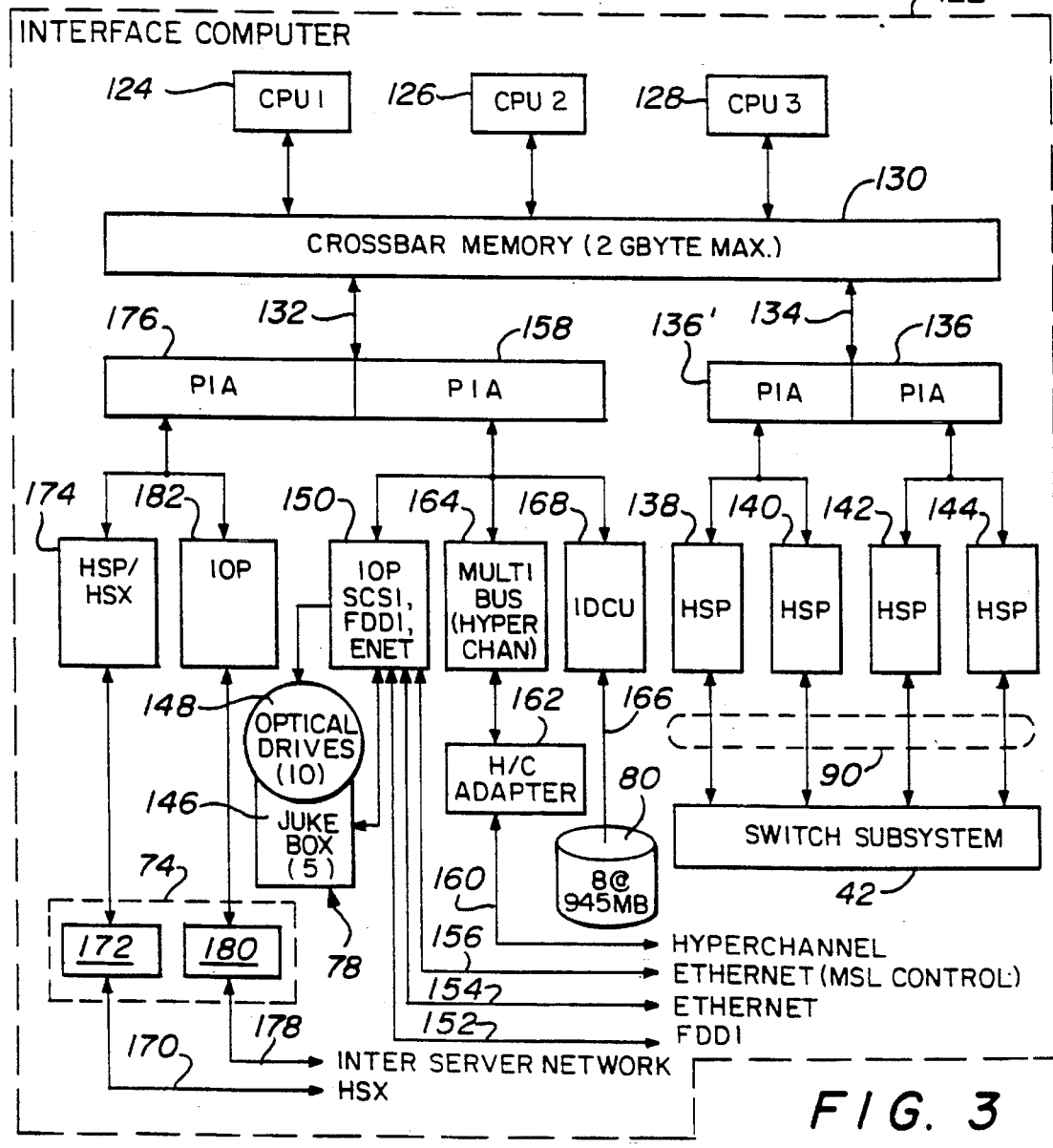
FIG. 3 is a diagrammatic representation of the tape server computer.

The C232 Computer 122 is disclosed in detail in FIG. 3. It contains three CPUs 124, 126, and 128. Each of the computers 124, 126, and 128 is coupled bidirectionally to a crossbar memory 130 which has two I/O Channels 132 and 134. The use of a multi-processor design allows for the run time software to permit dissimilar events or multiple interrupts to be processed in parallel. The Computer 122 uses a 64-bit word and is capable of having two GBytes of physical memory attached. This memory is partitioned into a system memory and a tape buffer memory. The output of the crossbar memory 130 on I/O channel 134 is coupled through peripheral interface adapter 136 to four high speed parallel interface units 138, 140, 142 and 144. The output of these high speed parallel interface units are the outputs 90 shown in FIG. 2 from the IFS Computer 122. They are used to transfer data to the Switch Subsystem 42.

The tape drive buffer forming part of the crossbar memory 130 is used to match the tape drive data transfer rate with the transfer rate of the connected interface to the user system. The tape buffer also provides for more efficient use of the drives. Data transfers to the drives occur when enough data has accumulated in the buffer to make an efficient transfer to the tape drive. Conversely, data transfers to the user system occur when the buffer has accumulated enough data from the tape drive to make an efficient transfer.

The entire two GByte memory range in the crossbar memory 130 is available to each Computer 124, 126, 128 and the I/O channels 132 and 134. All four of the tape drives through the high speed parallel interface unit 138, 140, 142 and 144 can be operating simultaneously. Each CONVEX ICM 122 has up to five file directory modules 78 (FDM) each comprising a storage medium that may consist of either a juke box 146 for storing optical disks along with two optical drives 148, or a magnetic disk drive system. The FDM 78 provides storage for the file system directories.

To provide fast and frequent access to directory information, the directory data is preferably placed on media separate from the actual data. By querying the FDM or VDM 78, users access the directory information of the library (for file or volume server applications) without mounting a tape into a drive. This allows the tape drive to be used more effectively by only handling data read and write operations. Tapes can be removed from the cassette library while directory data is maintained. When information on tape is exported to other sites, the removable media serves as a means to transport directory information to the receiving site, eliminating the need for an exhaustive survey of delivered tape media.

To achieve the goals of large storage capacity, removability, and fast and frequent access for storing directory information, a juke box containing erasable optical disks in storage bins and erasable optical disk drives is used. These disks are removable from the juke box for archive purposes and may be erased. Each jukebox contains storage for 24 erasable optical disks and space for two optical disk drives. Each of the disks is double-sided and holds a total of one Gbyte of data. The disk drives 148 use the magneto-optic method of erasability. These products are all currently commercially available. Alternatively, a magnetic disk drive system may be used, or the directory may be stored in a special reserved directory partition on the tape media.

The five FDMs or VDMs 78 are connected to an input/output processor 150 (IOP) along with the FDDI user input on line 152, the Ethernet user on line 154, and the MSL Control LAN on line 156. The IOP 150 interfaces with the processor interface adapter 158 which is coupled to the I/O channel 132. The user input on HYPERchannel® 160 is coupled through an adapter 162 to interface 164, the output of which is also in communication with the interface adapter 158. The user HiPPI channel on line 170 is coupled to Ultra circuit 172 in HIM 74 which is in communication with processor interface 174 and the interface adapter 176, the output of which is coupled to I/O channel 132.

The inter-server network 76, shown in FIG. 2A, is connected through line 178 to an Ultra network hub 180 in host interface module 74 and IOP 182 which allows for communications between CRAY Computer 120 and the CONVEX Computers 122. The communications consist of files transferred from the CRAY Computer 120 disk storage to be archived on any of the tape drives which are connected to the Computer 122. The Ethernet LAN line 156 is used for sending requests to the control subsystem 40 (shown in FIGS. 1 and 2) and for receiving status on the requests from the control subsystem 40.

The CRAY ICM Computer 120 is shown in detail in FIG. 4. The mainframe 184 is a CRAY X-MP/14se which is a vector processor having an estimated performance of 32 million instructions per second (MIPS). The I/O subsystem (IOS) consists of three different I/O processors (IOPs). The first is a master IOP (MIOP) 186, the second is a disk IOP (DIOP) 188, and the third is an auxiliary IOP (XIOP) 190. Two 100 MByte channels 192 and 194 connect the mainframe 184 to the IOS through the IOS buffer 196.

The MIOP 186 is responsible for providing interfaces to user HYPERchannel® 198, the FDDI channel 200, the Ethernet channel 202, and the inter-server network channel 78. An Ultra network hub 204, which is a part of the host interface module 74, is coupled to the MIOP 186 through a VME interface 206.

The DIOP 188 is responsible for interfacing the mainframe 184 central processor with the disk drives 208 and 210. The disk drives 208 and 210 provide a total of 9.6 Gbytes of disk storage using eight disk drives. The drives 208 and 210 are used to provide the online capacity for files stored by the mainframe 184. The drives 208 and 210 interface to the DIOP 188 through controllers 212 and 214.

The XIOP 190 is responsible for providing the HiPPI interface to the user line 216 through the Ultra interface 218, which consists of an Ultra network hub and link adapter which can extend the HiPPI channel to a maximum of two kilometers. There is also an IBM Block Mux channel 220 for attaching an IBM tape drive 222 to the mainframe 184. The IBM tape drive 222 is provided for maintenance purposes and as a way for loading new or modified system software.

As stated earlier in relation to FIG. 2, the switch module 42 (if used in the system 10) is composed of one or more switch components. FIGS. 5A and 5B are schematic representations of one crossbar switch node. The 2×2 crossbar switch 224 is the heart of the switch subsystem 42 and contains four independent ports 226, 228, 230, and 232. The switch 224 allows any two of the ports to be connected, thus providing the capability to support up to two simultaneous data transfers. The port independence allows the 2×2 crossbar switch 224 to be reconfigured without interrupting data transfers through the other ports. Thus, any one of the IFS computers may be connected not only to any one of the drive subsystems 48 but may also be connected to each other by switch 224.

Initially, every cross-bar switch node is set in a "straight-through" configuration, as shown in FIG. 5A. Port 226 is connected to port 230, and port 228 is connected to port 232. For a data transfer to occur, these ports connections are opened, and the desired ports are connected to provide the desired connectivity. In FIG. 5B, port 226 is connected to port 232 to provide connectivity between an interface computer (IFS2 and a drive subsystem 48 (DRS 1) (see FIG. 6). Note that switch node 236 need not be configured since it is still in the initialized "straight-through" configuration and therefore provides connectivity to the drive DRS 1. Thus, for any data transfer to take place, only one switch node needs to be configured.

The Non-Blocking algorithm that controls the cross-bar switch configuration is based on the premise that each IFS has exclusive access to the vertical ports of the switch nodes in its column. In FIG. 6, IFS 2 has exclusive use of vertical ports 226 and 230, and vertical ports on nodes 254 through "SNY" whereas ports 232 and 228 can be used by a second interface computer (IFS 1) to provide connectivity to DRS 1. This scheme of only allowing the IFSs vertical connectivity through its own switch node columns prevents an IFS from interfering or "blocking" the data transfer from another IFS.

For example, FIG. 6, shows three columns each represented as being accessed by an interface computer (IFS 1, IFS 2 and IFS 3) with N switches in each column, and includes N rows, each row having an output to a drive subsystem (DRS 1 through DRS N). An input to port 226 of the first 2×2 switch 224 may be coupled to any one of the other ports such as port 230. That port may be connected to any one of the ports of a second 2×2 crossbar switch 254 such as, for example, port 238. I/O port 238 may then be connected to any of the other ports of switch 254 such as port 250. In like manner, the connection may extend from port 250 of switch 254 to port 252 of switch SYN, and through port 256 to port 258 of switch SNZ. From port 260 of switch SNZ, the signal may be coupled to a drive system (DRS N). Any number of desired switches may exist between switch 224 and switch SNZ.

Thus, it can be seen that with connections as explained between the switches shown in FIG. 6, any IFS tape server computer 122, represented as IFS 1 through IFS 3 in FIG. 6, may have any one of its outputs 90 (see FIG. 2) coupled to any one of the input/output ports of the 2×2 crossbar switches with the resulting connection being made to any of the drive subsystem units 48 and the drive unit 44. It is in this manner that any IFS computer output could be globally connected to any particular drive subsystem 48 to read data from or write data to any tape. The SWS 42 provides dynamic connectivity so that IFS-to-DRS reconfiguration occurs without interrupting other channels.

As stated previously, the purpose of the switch subsystem 42 is to provide a logical and physical interface between interface subsystems 14, 16, 18 and 21 (see FIG. 2) and the drive subsystems 48 of the drive unit 44, and to enable an IFS to have global access to all DRS's 48. In the event global access to all drive subsystems 48 is not needed, the switch 42 may be deleted from the system and the IFS tape servers 14, 16, 18 and 21 will be coupled directly to a corresponding one or more drive subsystem(s) 48 to provide, in conjunction with storage 56, and transport 50, 52 and 54, global media access (see FIG. 14).

The SWS 42 is composed of modular components to accommodate all possible mass storage library configurations. This flexibility enables the mass storage library to be configured with a variable number of drives. The independence of each node port enables configured drives to transfer data concurrently and independently to/from separate users. The SWS 42 enables each IFS 14, 16, 18 and 21 to have access to any DRS 48 in the drive unit 44. This global DRS access capability allows the mass storage system to spread the user job load among drives and to minimize the need for media transport since nearer drives are considered prior to distant drives.

Figure 7:
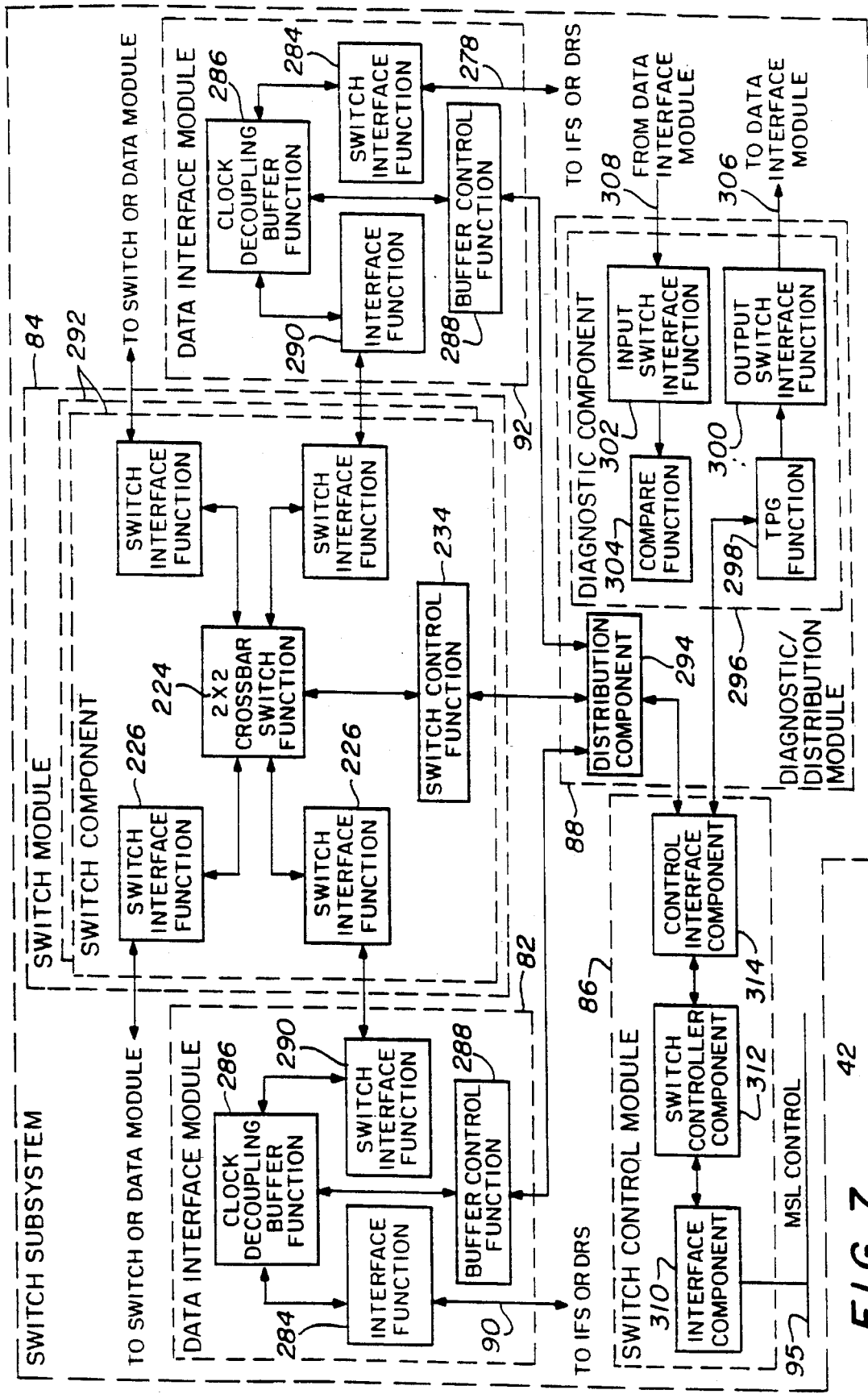
FIG. 7 is a diagrammatic representation of the switch subsystem utilizing the crossbar switches.

As illustrated in FIG. 7, the SWS 42 is composed of four modules. The data interface module (DIM) 82 provides the physical interface to either an IFS 14, 16, 18, or 21 or to a DRS 48. However, for purposes of simplicity, FIG. 7 will be discussed as if DIM 82 were connected to any IFS through line 90 while DIM 92 will be discussed as if it were connected on line 278 to a DRS 48. Again, however, it should be kept in mind that the SWS 42 could function in the reverse manner equally well. Thus, in FIG. 7, the DIM 82 will be considered as providing the physical interface to the IFS, although it could also be to a DRS.

The switch module 84 (SM) is the switching mechanism that contains the 2×2 crossbar switch 224 shown in FIGS. 5A, 5B and 6. The switch control module 86 (SCM) provides an interface to the MSL Control LAN 95 which is connected to the CNS 40 (see FIG. 2.) SCM 86 receives commands from the control subsystem 40 (CNS) and controls all modules and components of SWS 42. The diagnostic/distribution module 88 (DDM) contains the built-in test equipment for the SWS 42 and distributes control to each SWS 42 component.

As stated earlier, the DIM 82 is the component that provides the SWS 42 external interface to any IFS while DIM 92 provides the external interface to the DRS 48. The interface function 284 in both DIM 82 and DIM 92 contains the balanced differential drivers and receivers specified for the high speed interface. The clock de-coupling buffer unit 286 in both DIMs 82 and 92 provides a means to synchronize the input data with the SWS master clock signal (not shown). The de-coupling is accomplished using memory buffer unit 286 that operates in a ping/pong manner which supports simultaneous memory reads and writes. While input data is written into one memory buffer with the input clock signal, data is read out of the other memory buffer with the SWS 42 master clock signal.

The buffer control unit 288 in each DIM controls the ping/pong memory architecture, configures the DIM 82 (or 92) for diagnostic loop-back tests, and provides a control and status interface to the diagnostic/distribution module 88 (DDM). The switch interface unit 290 in each DIM 82 and 92 provides a common interface to the switch module 84. Each DIM 82 and 92 is essentially an extension of the IFS Data Server High Speed I/O channel.

The switch module 84 (SM) is composed of one or more switch components 292. Each switch component 292 contains a 2×2 crossbar switch 224, a switch interface unit 226 coupled to each of the four independent I/O ports and a switch control unit 234. The switch interface unit 226 provides the SWS 42 with modularity by providing connectivity to either a DIM 82 or 92 or to another switch component 292. Multiple switch components 292 may be connected together to achieve the desired number of external SWS 42 interfaces.

As stated earlier, in relation to FIGS. 5A and 5B, the 2×2 crossbar switch 224 is the heart of the SWS 42. The 2×2 crossbar switch 224 contains four independent I/O ports. This cross bar switch 224 allows any two ports to be connected, thus providing the capability to support up to two simultaneous data transfers. The port independence allows the 2×2 crossbar switch 224 to be reconfigured without interrupting data transfers through the other ports. The switch control unit 234 provides an interface to the distribution component 294 in the DDM 88. Control and status information are transmitted across this interface. Reconfiguration commands are received by the switch control unit 234 and distributed to the individual crossbar switch ports. Upon command, the switch control unit collects status from the switch component 292 and transmits the status to the distribution component 294. The switch component 292 provides an aggregate I/O bandwidth of 1280 Mbps.

The DDM 88 contains the distribution unit or component 294 and a diagnostic unit 296. The distribution unit 294 provides a command/status interface and distribution for the switch control module 86 (SCM). Upon receipt of a command, the distribution unit 294 distributes the control information to the appropriate SWS 42 component. The diagnostic unit 296 includes the SWS 42 built-in test equipment. It contains a test pattern generator 298, an output switch interface 300, an input switch interface 302, and a compare unit 304. Test pattern generator 298 generates known diagnostic test patterns upon command from the SCM 86 and are output through switch interface unit 300 on line 306. Line 306 connects the diagnostic unit 296 to a switch interface function port 226 in switch component 292 through a DIM 82. The diagnostic test patterns are received from the units being tested on line 308 to input switch interface 302 for verification. The compare function 304 verifies the diagnostic test pattern. The diagnostic unit 296 provides the SWS 42 with the capability to generate a diagnostic test pattern, route the test pattern through each, or selected, SWS 42 components, and verify the integrity of the test pattern. Such error detection capabilities on each of the SWS 42 components allows faults to be identified at the lowest replaceable unit level. It provides swift diagnosis of faulty components, and the novel connectivity and dynamic switching capabilities of the SWS 42 allows diagnostics to be executed without interrupting on-line data transfers.

The switch control module 86 (SCM) contains the components necessary to provide operational control of the SWS 42. The SCM 86 receives commands from and transmits status to the control subsystem 40 (CNS) through the MSL control LAN 95. The LAN interface unit 310 in the SCM 86 provides the SWS 42 interface to the MSL control LAN on line 95. This component is a commercially available off-the-shelf product. The switch controller 312 receives high level commands from the CNS 40 through interface 310 and converts these commands into detailed actions required by the SWS 42 components. Switch controller 312 is a commercially available controller product. The control interface unit 314 provides an interface between the commercially available switch controller unit 312 and the diagnostic distribution module 88. The control interface unit 314 is a commercially available product that contains the switch controller component interface. The control interface 314 does not contain enough I/O channels to support all of the command/status interfaces to each SWS 42 component. Therefore, the command/status information is passed from the control interface 314 via one parallel interface to the distribution unit 294 in DDM 88. The distribution unit 294 has sufficient I/O to support all command/status interfaces to each SWS 42 component.

Figure 8:
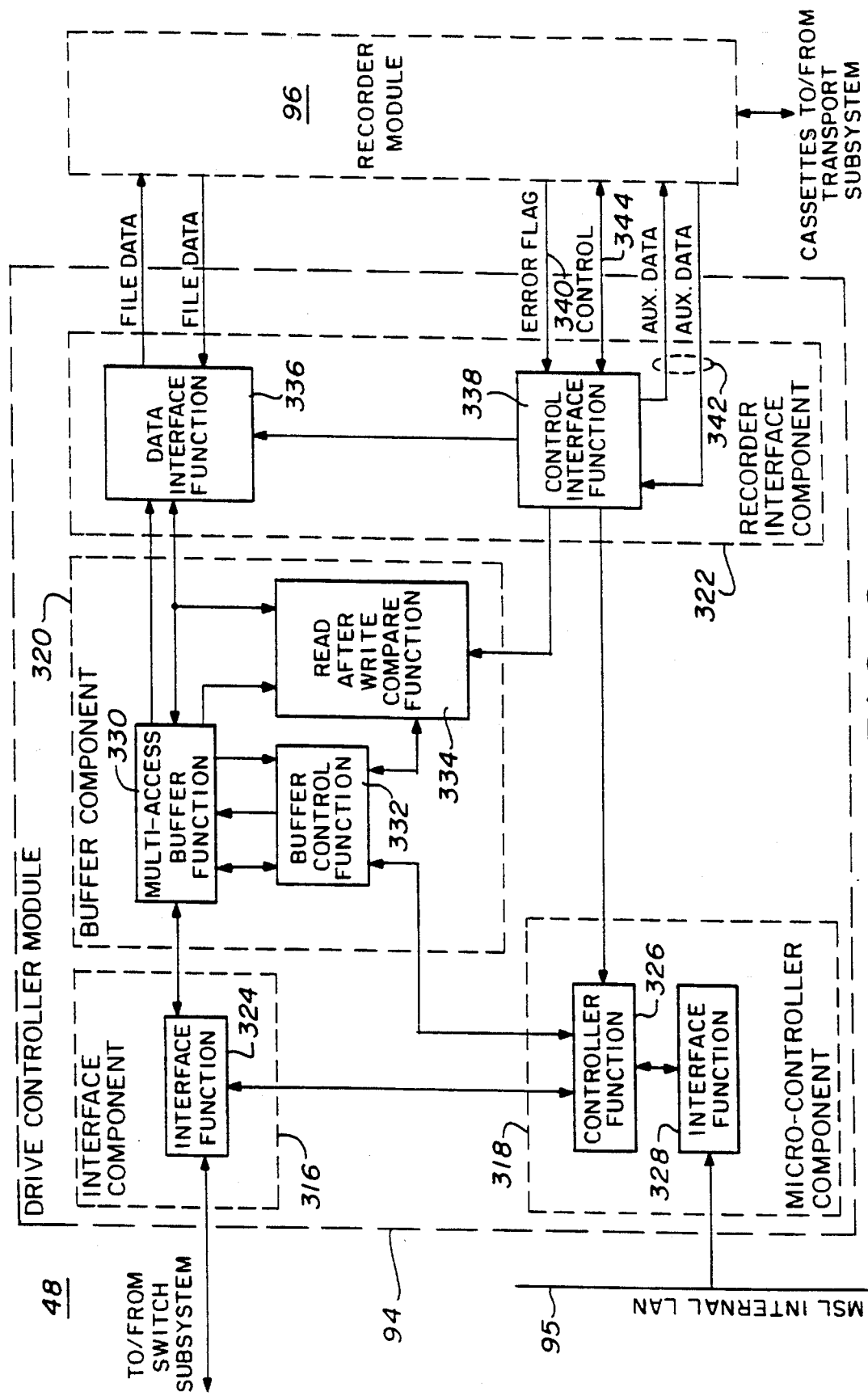
FIG. 8 is a schematic representation of the drive subsystem coupled to the switch subsystem for driving the recorder modules.

The details of the drive subsystem 48 (DRS) are shown in FIG. 8. In particular, the DRS 48 may comprise an ER-90 recorder manufactured by E-Systems, Inc., Dallas, Tex. DRS 48 contains a recorder module 96 (RM) and a drive controller module 94 (DCM). The RM 96 maybe of various types but in the preferred embodiment is a rotary head recorder. The drive controller module 94 (DCM) provides the interface to the switch subsystem 42. This interface, used in conjunction with the internal logic of the DCM 94 and an interface with the DCM 94 provides to the RM 96, allows the transfer of file data and control information between the RM 96 and an interface subsystem 14, 16, 18 or 21. (See FIG. 2.) The DCM 94 also provides an interface to the MSL control LAN from CNS 40 on line 95, which allows controlling the RM 96 which is not logically connected to an IFS 14, 16, 18 or 21.

The DCM 94 includes an interface component 316, a micro-controller unit 318 (MCC), a buffer unit 320, and a recorder interface 322.

The interface component 316 is a unit for interface with the SWS 42. It is designed for use in conjunction with the high speed parallel interface and allows the transfer of data between the IFS tape server, 14, 16, 18, or 21, and the DCM 94 at burst rates of up to 640 Mbps. Interface unit 316 contains the interface assembly 324 which provides for the high speed parallel operation as well as a generic synchronous interface for the remainder of the DCM 94.

The MIC component 318 provides operational control for the components of the DCM 94, except for the interface unit 316, and the RM 96. The MIC 318 comprises a controller 326 and is implemented with a 16 Mhz microprocessor and associated control circuitry, including an interrupt handler, dedicated random access memory (RAM), and read only memory (ROM), address decoding, and bus arbitrator.

The controller unit 326 also provides a set of command registers through which the microprocessor interfaces with the interface unit 316, buffer unit 320, and recorder interface 322. It also includes a connection with the LAN interface unit 328.

The LAN interface unit 328 provides for communication between an external subsystem controller (CNS 40) and the controller 326 via the MSL control line 95. The LAN interface unit 328 is implemented with a LAN chip-set to provide the standard interconnection. The MIC unit 318 allows the DCM 94 to operate in either of two modes, on-line and off-line.

The DCM 94 enters the on-line mode when a logical connection is made between IFS 14, 16, 18, or 21 and the DCM 94 through the switch subsystem 42. On-line operations occur when a particular IFS requires the use of a specific RM 96 to which the DCM 94 is connected for storing or retrieving file data. The MIC 318 receives commands from an IFS via the interface unit 316 in this mode and provides operational control accordingly. The received command requests an operational function such as data retrieval, data storage, file search, and the like. The operations provided includes generating high level commands for each of the components and the RM 96, monitoring overall modular operations, and coordinating inter-component activities. It also includes collecting individual component and RM 96 status messages and command responses and assembling these messages and responses in a format suitable for transmission to the IFS requesting the function.

The DCM 94 enters the off-line mode when there is not a logical connection between it and any IFS computer. In the off-line mode, the CNS 40, discussed in relation to FIG. 2, monitors the operability of both the DCM 94 and RM 96. It allows the IFS computer to maximize the use of the RM 96 to which the DCM 94 is connected. The MIC unit 318 receives commands from either the CNS 40 or IFS computer 14, 16, 18, or 21 via the LAN interface unit 328 in this mode and provides operational control based upon the command. The received command may instruct the performance of any operational capability, except the transmission of data to or from an IFS computer, since there is no logical connection. Off-line commands fall into one of two categories: diagnostic testing or preparation for on-line activity. The diagnostic testing commands allow the CNS 40 to monitor the operability of both the DCM 94 and RM 96. These commands are used to initiate the execution of the built-in test equipment available in both the DCM 94 and the RM 96. The commands preparing for an on-line activity allow an IFS computer to maximize the use of the RM 96. The commands enable activities, such as tape positioning before a logical connection is made between an IFS computer 14, 16, 18 or 21 and a RM 96, so that less post-connection time is lost due to searching for specific files on a tape. The performance of the MIC 318 is obtained with a 16 Mhz microprocessor implemented in the controller unit 326. The performance of the MIC 318 in the off-line mode is triggered by the LAN interface unit 328, which provides a serial communication path between the DCM 94 and the CNS 40.

The buffer component 320 compensates for both effective and burst data transfer rate disparities between the IFS tape server 14, 16, 18, or 21 and the RM 96. The buffer component 320 also provides verification of data being written to the tape and comprises a multi-access buffer unit 330, a buffer control unit 332, and a read-after-write compare unit 334.

The multi-access buffer unit 330 (MAB) provides the solid state memory necessary for temporary data storage as it is transferred between the individual IFS tape server and the RM 96. This memory off-loads some of the competition for the tape server's memory and allows portions of the file to be reaccessed in real-time to verify that it is was actually written to tape and for rewriting it to tape, if necessary. The buffer control unit 332 provides addressing and control information to the MAB 330 and allows the MIC unit 318 to access the MAB 330 for use in diagnostic testing.

The read-after-write compare unit 334 (RWC) provides the logic necessary to verify, during the write process, that the data is correctly, in a logical sense, being written to a tape. The RWC unit 334 also includes a means to indicate to the buffer control unit 332 that a portion of the file should be rewritten.

The MAB unit 330 is a 500 Mbit circular memory using commercially available 1 Mbit dynamic RAMs. The buffer size is that amount of memory which is necessary to compensate for the transfer rate variances and the expected latency from the time the data is written to tape until it is returned for verification. The MAB unit 330 provides a data interface to the interface unit 316, buffer control unit 332, the RWC unit 334, and the recorder interface unit 322. A combination of these interfaces allow simultaneous, non-conflicting access to the MAB 330, depending upon the type of command being executed. During a store to tape operation, the interface unit 316 transfers data to the MAB 330 while the recorder interface component unit 322 and the RWC unit 334 function simultaneously to receive data from different locations in the MAB 330. During a retrieve from tape operation, the recorder interface unit 322 transfers data to the MAB 330 while the interface unit 316 simultaneously retrieves data from a different location in the MAB 330.

During diagnostic operation, the MIC unit 318 transfers data to the MAB 330 via the buffer control unit 332. The MAB 330 subsequently transfers the data simultaneously to the recorder interface unit 322 and, at an address lag, to the RWC unit 334 to verify operation of the DCM 94 and/or RM 96. Data is stored in the MAB 330 in a format which is compatible with the interface to the interface unit 316. Format conversions are performed by the other units to which the MAB 330 interfaces.

The buffer control unit 332 has a state feedback controller and the logic necessary to provide functional control of the memory in the MAB 330, such as addressing, interface arbitration, transfer direction indication, and the like. The buffer control unit 332 contains registers addressable by the MIC unit 318 which allow for the transfer of high-level command and status messages. It also provides the MIC unit 318 with a data interface to the MAB unit 330 for use in diagnostic testing and provides an interface with the RWC unit 334 for determining when a portion of a file should be rewritten to tape. The buffer control unit 332 and its interaction with the MIC unit is only on a high-level command/status transfer basis. The buffer control unit 332 uses well known prior art techniques which allow multiple interfaces to have simultaneous, contention-free access to a common memory. This technique is based on time shifted memory data and address information for each of the interfaces supported.

The buffer control unit 332 also includes provisions for insuring that the file data is retrievable in a properly ordered manner. To do this, the buffer control unit 332 adds an identification marking to the data blocks before writing a block to tape. This is necessary because of the rewrite capability included in the implementation. When a file is read from tape, it is possible that duplicate blocks will be reproduced. This happens if an error occurs when the file was originally written, causing one or more blocks to be rewritten. The buffer control unit 332 uses the identification marking to determine which one of the duplicated blocks it should transfer to the interface unit 316 during a file retrieval operation. This capability insures the ability to retrieve error-free files in the order in which they were stored.

The RWC unit 334 uses a comparative circuit to provide positive verification that data was written to tape. This allows the comparison of data written to tape in diagnostic testing and provides a means by which defective tape is logically "cut-out" to insure that an acceptable bit-error-rate (BER) is maintained. The RWC unit 334 provides interfaces with both the MAB unit 330 and the recorder interface unit 322 to receive information previously written to tape. The RWC unit 334 performs a bit-for-bit compare operation on certain data to insure that the data received from the RM 96 is identical to that which was transferred to it for writing to tape.

Detection of errors during this process indicates that the correction capability of the error-detection-and-correction (EDAC) unit in the RM 96 was exceeded during the after-write reading of the data. This, in turn, implies an unacceptable imperfection in that tape section and causes the RWC unit 334 to instruct the buffer control unit 332 to rewrite the erroneous data on another section of the tape. By logically "cutting-out" bad tape sections in this manner, the uncorrected BER of the tape is effectively set without pre-screening it. This process, together with the tape's performance, and the error-detection-and-correction unit of RM 96 implements an error correction strategy which insures an acceptable BER for data stored to and retrieved from tape. The buffer unit 320 fully compensates, without degrading the effective channel transfer rate, for the difference between the fixed data transfer rate of RM 96 of 240 Mbps and an effective channel transfer rate which varies between 1 Mbps and the RM 96 (240 Mpbs) rate.

The recorder interface unit 322 (RCI) compensates for the data format and the logic differences between the MAB 330 and the RM 96. The RCI 322 also provides a means for converting the format and logic of the commands and status responses transferred between the MIC unit 318 and the RM 96. The RCI 322 is implemented using a data interface unit 336 and a control interface unit 338.

The data interface unit 336 (DIF) contains the balanced ECL (emitter coupled logic) line drivers and receivers required to transfer data between the DCM 94 and RM 96. The DIF 336 provides a unique interface pair (one input, one output) to both the MAB unit 330 and the RM 96 to enable this transfer. The design of the DIF 336 insures the ability of the RCI 322 components to simultaneously transfer data to and from the RM 96 thereby supporting the execution of read-after-write verification by the DCM 94. The DIF 336 also provides for clocking differences between the DCM 94 and RM 96 and provides an interface with the control interface unit 338 for receiving mode information. The DIF 336 operates in one of two modes based upon this information, normal and loop-back. In the normal mode, the DIF 336 allows for data transfers between the MAB unit 330 and the RM 96. In the-loop-back mode, which is entered only during diagnostic testing, the DIF 336 accepts data from the MAB 330 and transmits this data directly to the RWC unit 334 for comparison with the original data to verify the DIF 336 operation.

The control interface unit 338 (CIF) contains a set of command registers through which the MIC unit components communicates with the RW 96. The CIF 338 also includes the ECL interfaces over which the auxiliary data and the error flag are transmitted and the interface over which RW 96 commands and the status responses are transmitted.

The error flag on line 340 is a signal that indicates some level, less than maximum, of error correction capability that was exceeded by the error-detection-and-correction (EDAC) of the RW 96 during a file retrieval. This signal determines when, on initial data write, to re-write a data block, or on subsequent data reads, when a tape has degraded to a point that warrants re-writing it to another tape. This signal is used to monitor BER degradation over repeated tape use and time. The level at which the signal is asserted is programmable. The signal is also monitored the first time a file is written to tape to insure that it is written within a certain margin of correctability. Data blocks which fail the error correction threshold compare process will be rewritten on the tape. It is possible that a file is written to tape such that it passes the bit-for-bit compare during the read-after-write but the error correction capability is stressed to its limit in providing the correct data as output. In such case, a lower level will be programmed for which the error flag will signal that some correction capability has been exceeded.

The auxiliary data interface lines 342 provide a means to store housekeeping information on the cassette tape's longitudinal tracks for later use in the file search or retrieval processes. The auxiliary data interface lines 342 are implemented as a unique pair (one input, one output) of serial interfaces. The control interface 344 provides a bidirectional, serial interface through which RW 96 command and status messages may be transferred.

The data interfaces provided by the DIF unit 336 transfer data independently, and simultaneously, if desired, at a fixed rate of the RW 96 (240 Mbps) to and/or from the RW 96. The CIF unit 338 transfers information and status to and from the RW 96 at a standard rate of 9.6 Kbps. The auxiliary data interface 342 transfers information between the RW 96 and the CIF unit 338 at a rate of 38.4 Kbps.

The recorder module 96 provides a rotary head recorder which is known in the prior art and which is used for permanent storage and subsequent retrieval of file data in the mass storage system. The rotary recorder employs four pair of heads and uses a helical scan technique to provide high speed file storage and retrieval. The recorder uses the cassette tape as a storage medium. It has the capability of obtaining high tape speeds to support file searches. The RM 96 implements an innovative error correction strategy to insure an acceptable BER. Further, it includes a sophisticated set of built-in test features to insure unit testability. It also employs slant azimuth recording which provides a significantly better tolerance to tracking errors than non-slant azimuth recording and satisfies the BER requirement. Since the magnetic signals on adjacent tracks are perpendicularly oriented, much less induced noise is experienced due to magnetic coupling between a reproduced head and the magnetic signals from tracks adjacent to the track actually being read when tracking errors occur. The use of slant azimuth recording is an effective means to compensate for tracking errors due to the environmental effects on the tapes. It is also an effective means to ensure crossplay, since it compensates for the tracking errors due to mechanical tolerances in the construction of different recorders.

The RM 96 provides a parallel interface capable of transferring data at a fixed burst rate of 240 Mbps. The interface is provided as a pair (one input, one output) of uni-directional interfaces each of which are capable of obtaining the 240 Mbps transfer rate. Each interface is implemented with electronics to provide independent data transfers at 240 Mbps to support the read-after-write verification function. The RM 96 can transfer or receive contiguous blocks of information at the burst transfer rate based upon the issuance of a single command.

The recorder's tape transfer drive motors support the capability to perform fast file searches by providing the ability to shuttle the tape at speeds of up to 300 inches per second (IPS) in either the forward or reverse directions. The motors also provide smooth acceleration in transitioning between tape speeds to prevent tape damage. An auto load function includes automatically sensing a tape cassette size, loading the cassette on the reel hubs, and wrapping the tape around the helical scanner. The recorder 96 performs the complete autoload function within typically three seconds after the cassette has been inserted approximately five inches into the recorder by either a robotic accessor or manually by a human operator. The recorder 96 performs an unload function with similar but reversed steps upon command from the DCM 94. The execution of this command results in a partial ejection of the cassette (approximately three inches) which is sufficient for removal by a robotic accessor. As indicated earlier, the recorder module 96, as described, is available commercially.

The storage subsystem 104 (FIG. 2B) (STS) implementation of Global Cassette Access includes storage modules 112 preferably comprising rotational modules (RTM). The RTM 112 is implemented as a fixed rack which has dimensions of 40"×40"×40". The RTM 112 is configured with individual storage slots for the cassettes such that it uniquely stores one of two cassette sizes. The first configuration of the RTM 112 is illustrated in FIG. 9. In this configuration, the RTM 112 provides two columns, 346 and 348, of twenty storage slots in a side-by-side manner on each of two sides. A side is defined as a module face which normally makes cassettes accessible to a CAM 106 (see FIG. 2B), as opposed to an end which is a face that does not normally make cassettes accessible. Each storage slot 350 houses a single cassette, such that this configuration contains a total of 80 cassettes (40 cassettes accessible on each side).

In the second configuration shown in FIG. 10, the RTM 112 provides a single column 352 of 20 storage slots 354 on each of its two sides. Each slot 354 in this configuration is capable of accepting a single larger size cassette such that it contains a total of 40-cassettes (20 accessible on each side). The storage slots 350 or 354 are mounted inside the RTM 112 on a base 356 which is capable of rotation. This base 356 may be rotated so that all of the cassettes accessible on one side of RTM 112 are made accessible on the opposite side. The RTM 112 receives rotation commands from the CNS 40 through a well known type of interface that it provides to the storage control LAN signal on line 110 (FIG. 2B) from CNS 40. The storage control LAN signal on line 110 uses an Ethernet type LAN to which all the RTM 112s and all the transport subsystem 56 modules (FIGS. 1 and 2B) are connected for receiving commands from and transmitting status to the CNS 40.

The RTM 112 uses precision stepper motors to provide the rotation capability. Rotation is capable in 90 degree increments and is provided in a smooth manner such that the cassettes are not shaken excessively. Each storage slot 350 and 354 implements a well known retention mechanism for retaining the cassettes.

Figure 12:
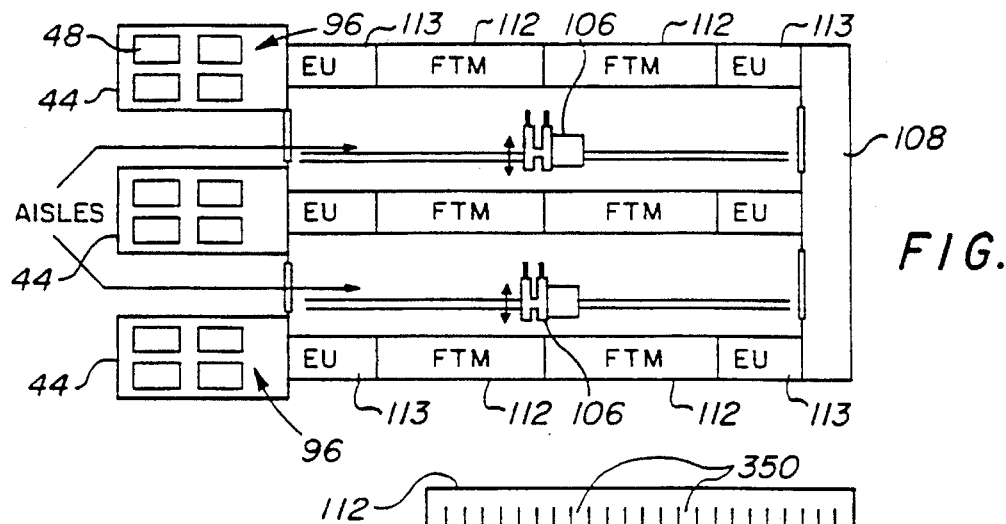
FIG. 12 shows a schematic top view of a feed-through configuration for the storage module along with the media accessor.
Figure 13:
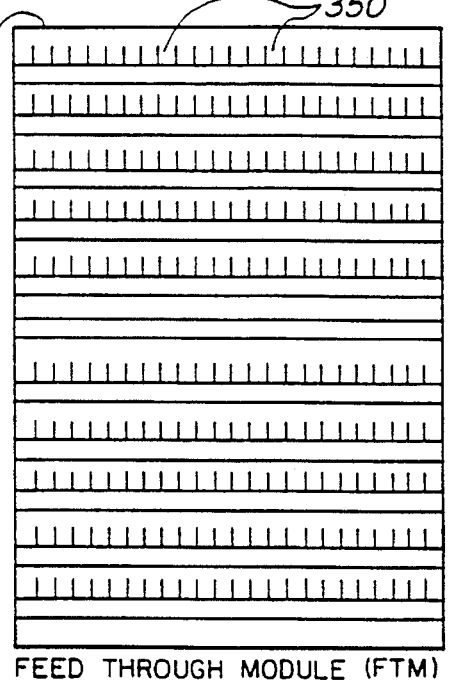
FIG. 13 shows a side view of the feed-through configuration for the storage module.

Alternatively, the storage subsystem 104 includes feed-through modules (FTM) 112 as shown in FIGS. 12 and 13. Each feed-through module 112 is implemented as a fixed rack similar to the rotational modules (RTM) 112 configured with a plurality of individual feed-through storage slots for cassettes. The slots are of the feed-through type and are positioned on opposed sides of the module 112 to make the cassettes stored on either side therein accessible to a CAM 106 located on either side of the module. The storage subsystem further includes end units (EUs) 113 for receiving tapes from the accessor for delivery to the recorder module or the lateral transfer module.

Figure 11:
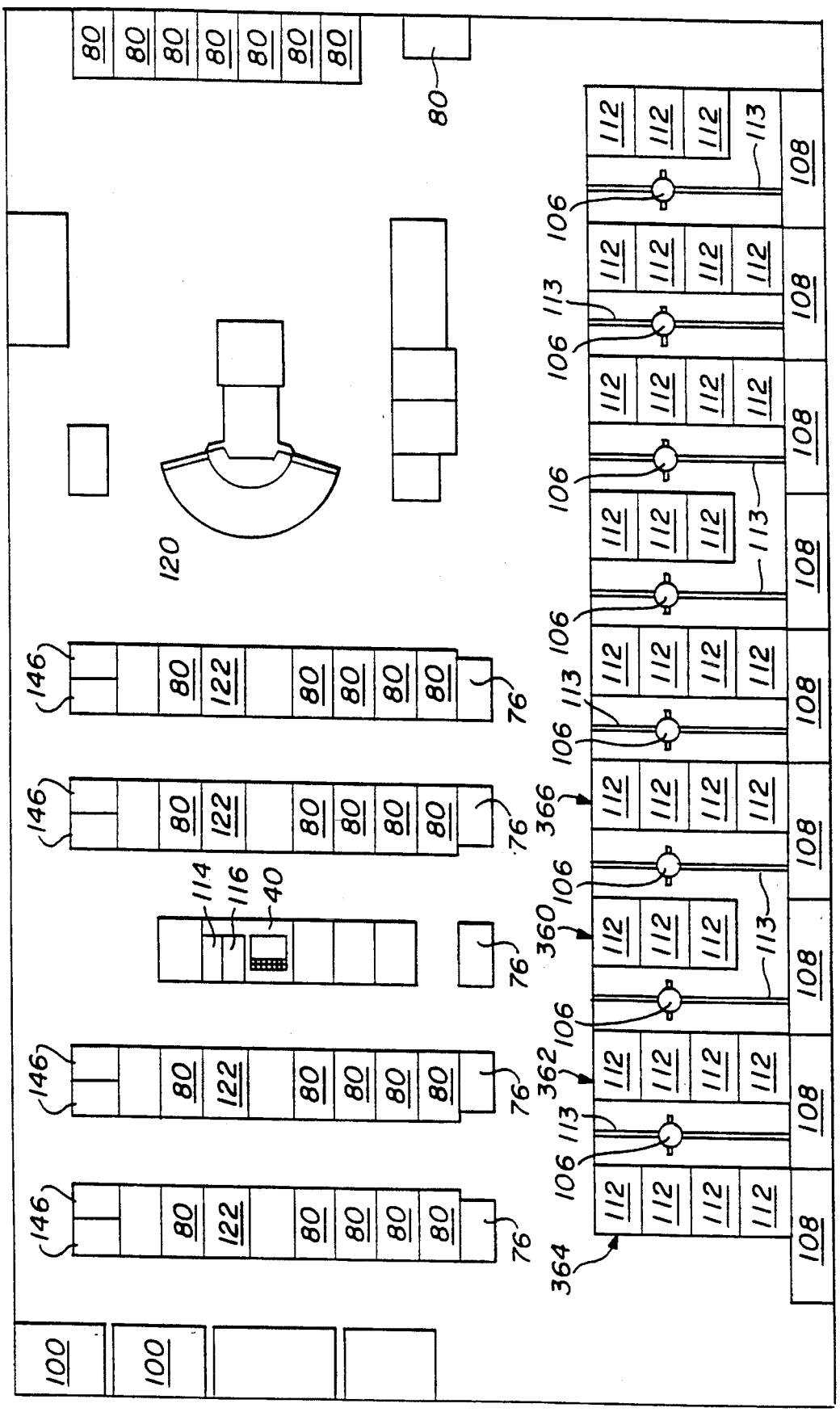
FIG. 11 is a diagrammatic representation of the floor plan of the present invention in its preferred installation form.

As can be seen in FIG. 11, which is a proposed floor plan of the Mass Storage Library of the present invention, the RTM 112 is designed to attach to a track component (not shown) along with other RTM modules 112 to form a storage row. The RTM 112 design allows for module stacking. This enables the configuration of storage columns which comprise up to four vertically centered RTMs 112. Alternatively, the storage row is comprised of a plurality of side-by-side feed-through modules (FTM) 112.

In the preferred embodiment of the RTM modules 112, some media storage slots 350 are used for housing the recorder module 96, as shown in FIG. 9. The mounting provisions are such that the recording module 96 provides a cassette interface with the cassette accessor module 106. With the FTM 112, access to the recorder module is provided through each end unit (EU) 113.

The ability of the RTM 112 to rotate provides the system with a built-in redundancy feature. The RTM 112 is rotated in the event of either a cassette accessor module 106 failure or a recording module 96 failure to allow a cassette to be accessed by a different cassette accessor module 106. This redundancy is a key element in the design, and is similarly provided by the feed-through access feature of the feed-through modules (FTM) 112.

Each of the bulk load modules 358 (BLM) (see FIG. 2B) serves as a cart for carrying cassettes which are to be loaded or have been unloaded from the lateral transfer modules 108. The BLM 358 is implemented as a rollable frame with provision for mounting two cassettes storage units, each of which is a box-like container with individual storage slots so that it stores cassette tapes. In one configuration, the cassette storage unit provides two columns of ten storage slots in a side-by-side manner. The total configuration contains twenty cassettes. The storage units store the cassettes such that they are accessible from only one side of the cassette storage unit. The bulk load module 358 is easily moved by one person over tile or carpeted floors and up and down ramps. A fully loaded cassette storage unit weighs approximately 30 pounds and is easily removed from the BLM 358 and inserted into the lateral transfer module 108 by one person. This allows a quick means of manually loading a large number of cassettes in the lateral transfer module 108 without reducing its full operational state.

The transport subsystem 56 (see FIG. 2B) is designed to insure that each cassette can be made accessible to each cassette accessor module 106 and can be used in conjunction with every recorder module 96. Each cassette accessor module 106 (CAM) has an accessor control electronics component which serves as the control function for the individual manipulator assembly. The control electronics receives the manipulator commands from the control subsystem 40 on line 110 in FIG. 2B. These commands are converted into discrete manipulator movement instructions which are transmitted to the manipulator assembly through a modulated duplex infrared communication link. Likewise, the electronics receives manipulator status through the infrared communication link and performs the conversion necessary for transmitting the status to the control subsystem 40 through the communication line 110. The control electronics 357 are mounted in the rotational module 112. See FIG. 9 and 10. By placing this module in the middle of a storage row's length, the manipulator assembly's communication range can be doubled. Use of the control electronics module 357 to provide manipulator assembly communications eliminates the possibility of physical cable interference that might otherwise be associated with movement.

It will be noted from FIGS. 11 and 12 that each cassette accessor module 106 moves between and parallel to two rows of storage modules 112. Thus, the faces or sides of the modules 112 which face inwardly towards the cassette accessor module 106 can be accessed by the cassette module 106. Thus, the CAM 106, which is located between rows 360 and 362 of modules 112, can access anyone of those modules which are facing inwardly to the space between the rows 360 and 362. Assume, however, that the CAM 106 between rows 360 and 362 malfunctions. In that event, the rotational modules (RTM) 112 in row 362 can be rotated 180 degrees to enable the CAM 106 between rows 362 and 364 to service them. In like manner, the rotational modules 112 in row 360 can rotate 180 degrees to allow the CAM 106 between rows 360 and 366 to serve them. Alternatively, with feedthrough modules (FTM) 112, the CAM 106 has access for service to both the side facing towards the CAM and the side facing away from the CAM. Thus, a natural redundancy is built into the system.

It can also be seen in FIG. 11 that the lateral transfer modules 108 are attached at the ends of the modules 112, thus allowing any cassette in any one module 112, in any given row, to be removed by the CAM 106 and transferred to a lateral transfer unit 108. Lateral transfer unit 108 will move that cassette from one lateral transfer unit to the other until it gets to the desired row of rotational modules 112 where the associated CAM 106 will remove it from the lateral transfer unit 108 and place it in the proper location in module 112.

Thus, there has been disclosed a novel mass storage library system which has three major functional subsystems, including a file server subsystem, a control function subsystem, and a media handling subsystem. The file server subsystem includes first a disk server interface computer which provides high-performance on-line archive capability. A plurality of second tape server interface computers couple the system users to any storage elements in the system through a switch module utilizing crossbar switches coupled to each other.

The media handling subsystem provides global access to storage elements and includes storage element modules which allows accessor modules to access storage elements stored on either side of the storage module, thus providing built in redundancy to the system. In addition, lateral transfer modules enable storage elements to be transferred from one row of rotational modules to another row.

The control subsystem provides the allocation and deallocation of all of the resources in addition to monitoring system activities, providing system diagnostics, and providing system information in hard copy or soft copy format.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined in the appended claims.

We claim:

1. A mass data storage and retrieval system, comprising:
    a plurality of information storage means forming a mass storage library;
    a plurality of data recorder modules for reading information from and writing information to information storage means, each of said data recorder modules configured to accept loading of at least one of the plurality of information storage means;
    interface means for bi-directionally coupling the data recorder modules to a host computer for simultaneous reading and writing of information from and to one of the plurality of information storage means loaded into one of the plurality of data recorder modules; and
    a control computer for generating a first command signal output to the mass storage library for loading one of the plurality of information storage means in one of the plurality of data recorder modules and for generating a second command signal for coupling the interface means to the data recorder module loaded with the information storage means.

2. The system as in claim 1 further including a library directory comprising means for storing a data directory of the information stored in the plurality of information storage means.

3. The system as in claim 2 wherein the library director further includes means for generating, in response to a request, a location output signal identifying one of the plurality of information storage means and a location on the identified information storage means responsive to the request, the control computer further including means responsive to the location output signal for generating the first command signal.

4. The system as in claim 1 further including a library director comprising means for storing a data directory of the data stored on the plurality of information storage means stored in the mass storage library, the library directory further including means for generating, in response to a request, a location output signal identifying one of the plurality of information storage means responsive to the request, the control computer including means responsive to the location output signal for generating the first command signal.

5. The system as in claim 1 further including buffer means for simultaneously storing information transmitted to the data recorder module loaded with the information storage means for writing to the information storage means and information received from the data recorder module as read from the information storage means.

6. The system as in claim 5 wherein the buffer means includes read-after-write comparison means for comparing the stored read information with the stored written information to verify the accuracy of the recording.

7. The system as in claim 1 wherein the mass storage library comprises:
a plurality of storage modules each having a plurality of openings in at least one side thereof for retaining information storage means; and
an accessor associated with the storage modules for retrieving one of the plurality of information storage means from an opening in the storage module for loading into one of the data recorder modules.

8. The system as in claim 7 wherein each of the plurality of data storage modules include a plurality of sides and further including means for enabling access by said accessor to each side for retrieving retained information storage means.

9. The system as in claim 8 wherein the means for enabling comprises means for positioning each storage module to enable access by said accessor to each side of the storage module.

10. The system as in claim 8 wherein the means for enabling comprises means for feed-through access by the accessor to the information storage means stored on any side of the storage module.

11. The system as in claim 1 further including means connected to the interface means for archiving frequently requested information from the mass storage library.

12. The system as in claim 11 further including:
means for monitoring the frequently requested information stored in the means for archiving according to certain parameters; and
means for manipulating the archived information in response to the parameters.

13. The system as in claim 12 wherein the means for manipulating comprises means for transmitting archived information to a designated information storage means of the mass storage library when the parameters vary from a preset limit.

14. The system as in claim 12 wherein the means for manipulating comprises means for truncating the information stored in the means for archiving when the parameters vary from a preset limit.

15. A mass data storage system comprising:
a storage module for storing a plurality of discrete data storage elements, the storage module having first and second opposed sides, the first side having a first means for providing access to one of the plurality of data storage elements and the second side having second means for providing access to the one of the plurality of data storage elements;
a first accessor module for retrieving and carrying one of the plurality of data storage elements through the first means for providing access to a first recorder module;
a second accessor module for retrieving and carrying one of the plurality of data storage elements from the second means for providing access to a second record module; and
first and second recorder modules each having means for receiving one of the plurality of data elements and means for writing data to and reading data from the one of the plurality of data storage elements.

16. The mass data storage system of claim 15 wherein the storage module includes a plurality of slots, and wherein the first means for providing access includes an opening to the slot on the first side and the second means for providing access includes a second opening to the slot on the second side.

17. A mass data storage library system, comprising
a plurality of storage means collected in a library and retrievable therefrom;
directory means for storing directory information and for generating, in response to a request, a location signal identifying the storage means responsive to the request;
a plurality of data recorders for reading data from and writing data to a received storage means; and
means responsive to the location signal for retrieving the identified storage means from the library, wherein the means for retrieving retrieves the identified storage means from the library for delivery to any one of the plurality of data recorders.

18. A mass data storage library system, comprising:
a plurality of storage means collected in a library and retrievable therefrom;
directory means for storing directory information and for generating, in response to a request, a location signal identifying the storage means responsive to the request;
a plurality of data recorders for reading data from and writing data to a received storage means;
means responsive to the location signal for retrieving the identified storage means from the library, wherein the means for retrieving retrieves the identified storage means from the library for delivery to any one of the plurality of data recorders; and
means for connecting one of a plurality of host computers to any one of the plurality of data recorders to enable the host computer to read data from and write data to the storage means received in the data recorded connected to the host computer.

* * * * *